United States Patent [19]

Long, II et al.

[11] Patent Number: 5,319,101
[45] Date of Patent: Jun. 7, 1994

[54] REACTIVE IMIDE MONOMERS AND RADIATION CURABLE POLYMERS DERIVED THEREFROM

[75] Inventors: Carl J. Long, II, Elyria; William F. Masler, III, Hinckley; William R. Wilber, Avon Lake; Gary L. Julian, Parma, all of Ohio

[73] Assignee: The B.F. Goodrich Company, Akron, Ohio

[21] Appl. No.: 906,715

[22] Filed: Jun. 30, 1992

Related U.S. Application Data

[63] Continuation-in-part of Ser. No. 516,409, Apr. 30, 1990, Pat. No. 5,196,550.

[51] Int. Cl.$^5$ .............................................. C07D 207/40
[52] U.S. Cl. ...................................... 548/548; 548/545
[58] Field of Search ................................. 548/548, 545

[56] References Cited

U.S. PATENT DOCUMENTS

| | | | |
|---|---|---|---|
| 2,650,207 | 8/1953 | Rust et al. | 260/45.4 |
| 4,079,041 | 3/1978 | Baumann et al. | 260/63 |
| 4,107,174 | 8/1978 | Baumann et al. | 260/326 |
| 4,107,326 | 8/1978 | Goldman et al. | 424/304 |
| 4,163,097 | 7/1979 | Baumann et al. | 525/531 |
| 4,172,836 | 10/1979 | Baumann et al. | 260/326 |
| 4,174,326 | 11/1979 | Baumann et al. | 260/326 |
| 4,193,927 | 3/1980 | Baumann et al. | 260/326 |
| 4,283,509 | 8/1981 | Zweifel et al. | 525/375 |
| 4,642,353 | 2/1987 | Berger | 548/431 |
| 4,644,069 | 2/1987 | Baumann et al. | 549/261 |
| 4,656,292 | 4/1987 | Roth | 548/549 |
| 4,788,295 | 11/1988 | Rakoutz | 548/549 |
| 4,808,646 | 2/1989 | Dahms | 524/104 |
| 5,068,356 | 11/1991 | Wichev | 548/548 |
| 5,112,989 | 5/1992 | Yonemoto et al. | 548/548 |
| 5,130,378 | 7/1992 | Blum et al. | 548/548 |

OTHER PUBLICATIONS

"DMMI-Photopolymers and Their Technical Application", M. Roth and B. Muller, a Ciba-Geigy AG publication.

"A New Class of Photopolymers with Pendant Dimethylmaleimide Groups-Part II", Die Augewandte Macromolecular Chemie 133 (1985) Apr. 1984 147-170, J. Finter, Z. Haniotis, F. Lohse, K. Meier and H. Zweifel.

"Telechelic Polymers-Precursors to High Solids Coatings", Progress in Organic Synthesis 7 (1979) 289-329, R. D. Athey Jr.

"Synthesis of Telechelic Polymers" Presented at the Water-Borne and Higher Solids Coating Symposium, Feb. 25-27, 1981, New Orleans, La. Abstract, R. Athey.

"Cross-linkable Polyester Imides" British Polymer Journal 19 (1987) 453-458, F. S. Serna et al.

*Primary Examiner*—David B. Springer
*Attorney, Agent, or Firm*—Walter C. Danison; George W. Moxon, II

[57] ABSTRACT

Reactive multifunctional imide monomers have been discovered from which radiation curable oligomers and polymers may be derived. The reactive imide monomers have at least one functional group which is polymerizable under free radical or ionic polymerization conditions with other similar functional groups. However, the same functional group and reaction product derived therefrom is substantially not subject to cleavage by oxidation or hydrolysis. The reactive imide monomer also contains at least one other functional group which remains intact under the above-described polymerization conditions to form a part of a side chain of the resultant polymer and will cross-link or cure by 2+2 cyclo-addition with other like functional groups upon irradiation.

4 Claims, No Drawings

REACTIVE IMIDE MONOMERS AND RADIATION CURABLE POLYMERS DERIVED THEREFROM

This application is a continuation-in-part of U.S. Application Ser. No. 07/516,409, filed Apr. 30, 1990 now U.S. Pat. No. 5,196,550. The foregoing prior application is incorporated herein by reference in its entirety.

BACKGROUND OF THE INVENTION

1. Field of the Invention

The present invention relates generally to reactive imide monomers and the radiation curable polymer systems derived from such monomers. More specifically, the imide monomers according to the present invention contain at least one ethylenically unsaturated moiety which is reactive with other ethylenically unsaturated moieties under polymerization conditions to produce a radiation curable polymer. The imide moiety becomes part of a side chain of the resultant polymer and is capable of undergoing a cross-linking reaction, specifically a 2+2 cycloaddition reaction, upon exposure to radiation to form a cross-linked polymer network.

2. State of the Art

Thermoplastic acrylic polymers and the like, which can be converted to thermosetting polymers by electromagnetic irradiation or other forms of radiation, have been known for some time. Recently, materials based on a dimethylmaleimide (DMMI) modified (meth)acrylic esters have been prepared. These systems often need to be photosensitized to achieve the proper cure because of the lack of a good chromophore. These systems are also susceptible to hydrolysis as are all esters.

Systems based on dimethylmaleimides (DMMI) are known to be photochemically reactive when irradiated with light of suitable wavelength, typically about 350–450 nanometers (a conventional photosensitizer is also often added). When photochemically reacted, the DMMIs typically dimerize in a (2+2) cycloaddition mode to give substituted cyclobutane derivatives as illustrated in Scheme I below.

Scheme 1:
Photo Induced Cyclo-addition Reaction OF DMMIs

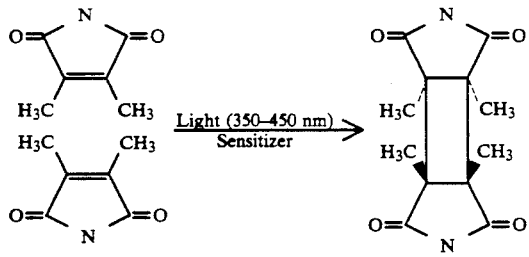

The DMMI-monomer can be copolymerized with one or more ethylenically unsaturated comonomers in solution with radical initiators such as AIBN (Azobisisobutyronitrile) to yield soluble DMMI-copolymers with statistical distribution of the monomer units within the macromolecule. Once the polymer backbone is synthesized, the resulting polymer typically comprises only one readily reactive functional group, i.e., the pendant DMMI groups. These groups may be reacted together using ultraviolet light (and typically also a UV sensitizer) such as is illustrated in Scheme I, thereby cross-linking the polymers.

Such DMMI polymeric systems are generally advantageous, because the tetrasubstituted carbon-carbon double bond of the DMMI typically does not participate to any extent in the free radical polymerization reaction used to prepare the DMMI containing polymer. Most other known photosensitive functional groups will typically enter into a free radical initiated polymerization reaction, typically causing unwanted gelling and the like.

However, synthesizing the polymer backbone is generally not a simple reaction and is oftentimes difficult to perform on an industrial scale. Furthermore, the resulting polymer with DMMI functionality is generally not readily susceptible to variations in cross-linking, and oftentimes a more complex cross-linked network is necessary to achieve desired properties.

"DMMI-Photopolymers and Their Technical Application" by M. Roth and B. Muller, Ciba-Geigy AG, is a publication describing DMMI synthesis, DMMI polymer synthesis and cross-linking DMMI polymers by photoreacting the DMMI groups.

"A New Class of Photopolymers with Pendant Dimethylamaleimide Groups—Part I", *Die Angewandte Makromolekular Chemie* 128 (1984) 71–97 by Juergen Finter, Edward Widmer, and Hans Zweifel and "A New Class of Photopolymers with Pendant Dimethylmaleimide Groups—Part II", *Die Angewandte Makromolekular Chemie* 133 (1984/5) 147–170, by Juergen Finter, Zeppos Haniotis, Friedrich Lohse, Kurt Meier and Hans Zweifel, are articles which discuss and describe DMMI chemistry.

U.S. Pat. No. 4,107,174 to Baumann et al entitled "Imidyl Compounds" is directed to photoreactive imidyl compounds, such as DMMI and is also directed to polymeric imidyl compounds which are photo crosslinkable. U.S. Pat. Nos. 4,107,326 and 4,193,927 both to Baumann et al are also entitled "Imidyl Compounds" and are divisionals of U.S. Pat. No. 4,107,174.

U.S. Pat. No. 4,163,097, also to Baumann et al, discloses cross-linkable polymeric compounds which contain light-sensitive alkyl substituted cyclic imide groups.

U.S. Pat. No. 2,680,207 to Rust et al discloses N-vinyl imides containing ethylenically unsaturated groups in the imide ring which are unsubstituted. The disclosure is directed toward thermally initiated polymerization of the N-vinyl imides.

U.S. Pat. No. 4,788,295 to Rakoutz discloses only unsubstituted maleimide thermosetting reactants where reaction is initiated thermally.

U.S. Pat. No. 4,808,646 to Dahms discloses bismaleimides and maleimide acids which are unsubstituted and which are useful in preparing laminates based on bismaleimide resins.

The above-described maleimide and imidyl bifunctional monomers suffer from the fact that their radically polymerizable site is subject to cleavage either by oxidation or hydrolysis or due to the fact the unsubstituted imide groups are not easily reacted or cross-linked by radiation. Moreover, as pointed out, the resultant polymer system often requires the addition of a photosensitizer to achieve the desired cure by irradiation.

SUMMARY OF THE INVENTION

In accordance with the present invention, multifunctional monomers have been developed to polymerize primarily by a free radical process or, in some instances, by an ionic mechanism through one reactive functionality while leaving the other functionality intact. The functionality left intact becomes a part of the side chains of the resultant polymer and is capable of undergoing a 2+2 cyclo-addition reaction with another like moiety in the presence of radiation.

The monomers according to the present invention do not suffer from the problem of the radically polymerizable functionality being subject to cleavage by hydrolysis. This is due, in part, to the lack of hydrolytically labile groups binding the functional group to the polymer chain.

Further in accordance with the present invention, compounds represented by Formula (I) are provided:

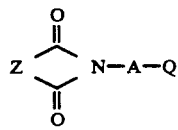

wherein Z is an ethylenically unsaturated hydrocarbyl based or substituted hydrocarbyl based group containing from 3 to about 12 carbon atoms, A is substituted or unsubstituted hydrocarbylene linking group, a heteroatom linking group, or a heteroatom containing a substituted or unsubstituted hydrocarbylene linking group, and Q is at least one ethylenically unsaturated substituted aromatic group wherein the bonds resulting from the reaction of Q upon polymerization exhibit greater stability to hydrolysis.

Still in accordance with the present invention, polymers are provided which have repeating units represented by Formula (II):

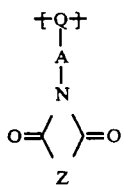

wherein Z is an ethylenically unsaturated hydrocarbyl based or substituted hydrocarbyl based group containing from 3 to about 12 carbon atoms, A is substituted or unsubstituted hydrocarbylene linking group, a heteroatom linking group, or a heteroatom containing a substituted or unsubstituted hydrocarbylene linking group, and Q is at least one reacted ethylenically unsaturated substituted aromatic group wherein the linking bonds to Q exhibit greater stability to hydrolysis and preferably Q is

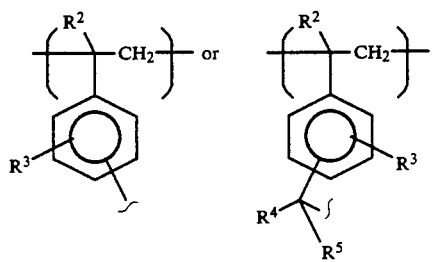

wherein $R^2$ is hydrogen or lower alkyl, $R^3$ represents hydrogen, lower alkyl or halogen and $R^4$ and $R^5$ are the same or different and represent hydrogen or alkyl.

Still in accordance with the present invention, a process for curing the polymer of Formula (II) is provided by exposing the polymer to radiation. In one embodiment, the radiation is ultraviolet light.

Still in accordance with the present invention, a photocured polymer is provided which is represented by Formula (III):

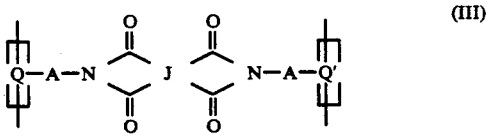

wherein J represents a substituted cyclobutane group derived from two ethylenically unsaturated hydrocarbyl based or ethylenically unsaturated substituted hydrocarbyl based groups containing from 3 to about 12 carbon atoms wherein said groups have undergone a 2+2 cycloaddition reaction, A is substituted or unsubstituted hydrocarbylene linking group, a heteroatom linking group, or a heteroatom containing a substituted or unsubstituted hydrocarbylene linking group, and Q and Q' are independently at least one reacted ethylenically unsaturated substituted aromatic group wherein the linking bonds to Q and Q' exhibit greater stability to hydrolysis and are preferably:

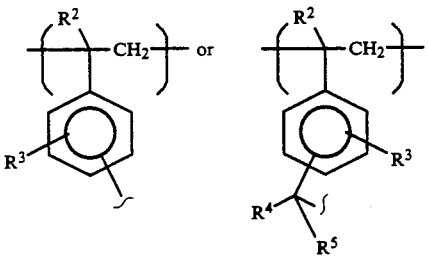

wherein $R^2$ represents hydrogen or lower alkyl, $R^3$ represent hydrogen, lower alkyl or halogen and $R^4$ and $R^5$ are the same or different and represent hydrogen or alkyl.

Still in accordance with the present invention, radiation curable compositions comprising the polymers represented by Formula (II) are provided which cure or cross-link with a relative high degree of efficiency.

Still in accordance with the present invention, curing different polymers described herein results in the formation of an interpenetrating polymer network.

Still in accordance with the present invention, multifunctional monomers, radiation curable polymers and compositions are provided which have utilities in the fields of electronics, inks and coatings.

Still in accordance with the present invention, a method of preparing an interpenetrating polymer network is provided which comprises the steps of:

a) combining at least two polymers of the type represented by Formula (II) wherein the Q groups of each of said polymers are different, and b) exposing the resulting combination of polymers to radiation.

These and other aspects of the present invention will become clear to those skilled in the art upon the reading and understanding of the specification and claims.

DETAILED DESCRIPTION OF THE PREFERRED EMBODIMENTS

Novel multifunctional monomers have been discovered wherein at least one of the available reactive functional groups is reactive under free radical or ionic polymerization conditions while at the same time it is not subject to cleavage by such mechanisms as oxidation, hydrolysis or the like. Moreover, at least one other available reactive functional group remains intact, i.e., is unreacted, under free radical or ionic polymerization conditions. The unreacted functional group is capable of undergoing a 2+2 cycloaddition reaction with another similar group upon exposure to radiation. Thus the present invention is directed to these novel monomers, the resultant radiation curable oligomers and polymers, methods of curing such oligomers and polymers by radiation, radiation curable compositions comprising such polymers, the radiation cured polymers derived from exposing such polymers to radiation and articles of manufacture comprising and/or utilizing such polymers or compositions comprising such polymers.

As used herein, the term "hydrocarbyl based group" denotes a substituent having a carbon atom directly attached to the remainder of the molecule and having predominantly hydrocarbon character within the context of this invention. Such groups include the following:

(1) Hydrocarbon groups; that is, aliphatic (e.g., alkyl or alkenyl), alicyclic (e.g., cycloalkyl or cycloalkenyl), aromatic, aliphatic- and alicyclic-substituted aromatic, aromatic-substituted aliphatic and alicyclic radicals, and the like, as well as cyclic radicals wherein the ring is completed through another portion of the molecule (that is, any two indicated substituents may together form an alicyclic radical). Such groups are known to those skilled in the art.

(2) Substituted hydrocarbon groups; that is, radicals containing nonhydrocarbon substituents which, in the context of this invention, do not alter the predominantly hydrocarbon character of the radical. Those skilled in the art will be aware of suitable substituents; examples are halo, alkoxy, alkylthio, carbalkoxy, nitro and carboxyl.

(3) Hetero groups; that is, radicals which, while predominantly hydrocarbon in character within the context of this invention, contain atoms other than carbon present in a chain or ring otherwise composed of carbon atoms. Suitable hetero atoms will be apparent to those skilled in the art and include, for example, nitrogen, oxygen and sulfur.

In general, no more than about three substituents or hetero atoms, and preferably no more than one, will be present for each 10 carbon atoms in the hydrocarbon-based group.

Preferably, the hydrocarbon-based groups in the compositions of this invention are free from acetylenic unsaturation.

As used in the present specification and claims, the term "lower", when used in conjunction with terminology designating a chemical group such as alkyl, alkenyl, alkylene and the like, is intended to describe such groups having a total carbon atom content of up to and including 7. For example, "lower alkyl" includes all straight and branched chain alkyl groups of up to and including 7 carbon atoms.

Typically the substituent groups are aliphatic hydrocarbon-based groups containing from 1 up to about 35 carbon atoms, preferably from about 4 up to about 30 carbon atoms and more preferably from about 8 up to about 28 carbon atoms. The substituent group may be a branch chain or straight chain configuration; however, it is preferred that at least 8 carbon atoms are in a straight chain configuration and, more preferably is substantially straight chain configuration. Furthermore, the substituent group is preferably alkyl or alkenyl.

The term "substantially straight-chain" means that the group contains no more than about 2 methyl groups.

The term "hydrocarbylene" refers to a hydrocarbyl based group absent at least two hydrogen atoms linking at least two other substituents.

The Multifunctional Monomers

The multifunctional monomers of the present invention are generally represented by Formula (I). The major advantages gained by using these monomers are based on their improved hydrolytic stability as compared to those systems discussed under the state of the art and the fact that there is no need for a photosensitizer which may bloom or leach from the system after curing.

A third advantage of the novel monomers is due to the generally superior electrical properties of styrenic and like polymers when compared to acrylates and methacrylates. This makes the monomers of this invention especially useful in the manufacture of such products as solder masks for printed circuit boards where polymer electrical properties are very important.

The monomers are derived from compounds represented by Formulae (IV) and (V) below.

(IV)

wherein Z is an ethylenically unsaturated hydrocarbyl based or substituted hydrocarbyl based group containing from 3 to about 12 carbon atoms and X is hydrogen or other functionality reactive with the compound represented by Formula (V) below, for example such functionalities include hydroxy, alkylene hydroxy, alkoxy, alkylene alkoxy and the like.

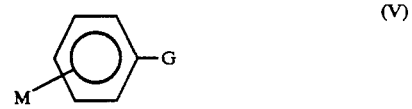
(V)

The other compound is an aromatic compound and is represented by Formula (V) wherein M is a functionality reactive with the X functionality of the compound represented by Formula (IV) and comprises halogen, alkylene halogen, isocyanate, alkylene isocyanate, amino, alkylene amino and G is a free radical polymerizable group comprising alkylene vinyl, arylalkyl vinyl and alkylene alkyl vinyl.

Preferably the compound represented by Formula (IV) is a maleimide where Z is

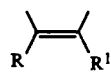

wherein R and R¹ are the same or different and are selected from the group consisting essentially of —CH₃, —CH₂CH₃ and —Cl with the proviso that only one of R and R¹ may be H and X is H or alkylene hydroxy.

Likewise the compounds represented by Formula (V) preferably are the compounds where M is alkylene halogen, alkylene isocyanate, amino and wherein G is alkylene vinyl, alkylene alkyl vinyl or aryl alkyl vinyl.

In a most preferred embodiment, without intention to be so limited, the most preferred compounds represented by Formula (IV) are N(-2-hydroxyethyl)-2,3-dimethylmaleimide and 2,3-dimethylmaleimide. The most preferred compounds represented by Formula (V) are p-aminostyrene, vinyl benzylchloride and m-isopropenyl -α,α-dimethylbenzyl isocyanate.

In general, the monomers of the present invention may be prepared by reaction in the presence of a base with heating. Although, some adjustments may be required with respect to the specific base and the time and/or temperature of heating depending on the volatilities of the specific reactants of Formulae (IV) and (V). Essentially equimolar quantities of the styrenic reactant (V) and the imide reactant (IV) are reacted. Alternatively, the isocyanate containing compounds are reacted with an alcohol in the presence of a catalyst with heating.

Radiation Curable Polymer

The radiation curable polymers, which include oligomers, according to the present invention are represented by Formula (II) and are derived from the monomers represented by Formula (I) which are discussed above, and other ethylenically unsaturated monomers or oligomers. It is contemplated in accordance with the present invention that the reactive imide monomers of the present invention will polymerize with themselves and in conjunction with any one of a number of ethylenically unsaturated monomers, oligomers, macromers or prepolymers resulting in a polymer of Formula (II) having an unreacted ethylenically unsaturated site in the imide ring which is capable of undergoing a 2+2 cyclo-addition reaction with another similar functionality upon exposure to radiation.

The backbone of the polymer represented by Formula (II) is comprised substantially of hydrocarbon repeating units and the side chains contain the radiation curable imide groups. Among the ethylenically unsaturated reactants that may be employed to prepare the backbone of the polymer in accordance with the present invention there may be mentioned acrylic acid and the esters thereof, methacrylic and the esters thereof, acrylamide, methacrylamide, acrylonitrile, methacrylonitrile, ethylene, propylene, 1-butene, 2-butene, dienes include 1,3-butadiene, isoprene, 2,3-dimethyl-1,3-butadiene, 2-methyl-1,3-pentadiene, 3,4-dimethyl-1,3-hexadiene, 4,5-diethyl-1,3-butadiene, and the like. The vinyl substituted aromatic compounds include styrene, 1-vinyl-naphthalene, 2-vinylnaphthalene, and the alkyl, cycloalkyl, aryl, alkaryl and aralkyl derivatives thereof in which the total number of carbon atoms in the compound is generally at least 8 but not greater than 20. Examples of such compounds include the various vinyltoluenes such as 2-,3-, or 4-methylstyrene, alphamethylstyrene, 4-n-propylstyrene, 4-t-butylstyrene, 4-dodecylstyrene, 4-cyclohexylstyrene, 2-ethyl-4-benzylstyrene, 4-methoxystyrene, 4-dimethylaminostyrene, 3,5-diphenoxystyrene, 4-p-tolystyrene, 4-phenylstyrene, 4,5-dimethyl-1-vinylnaphthalene, 3-n-propyl-2-vinylnaphthalene, and the like; vinyl esters such as vinyl acetate, vinyl halides such as vinyl chloride, vinylidene chloride and the like; and vinyl heterocyclics such as 2-vinylpyridine, 3-vinylpyridine, 4-vinylpyridine, 3-ethyl-5-vinylpyridine, 3-methyl-5-vinylpyridine, 3,5-diethyl-4-vinylpyridine and similar mono- and disubstituted alkaryl pyridines, and the like; quinolines such as 2-vinylquinoline, 3-vinylquinoline, 4-vinylquinoline, and so forth.

It should be recognized that one or more of the ethylenically unsaturated reactants exemplified above may be polymerized with the reactive imide monomers of the present invention to give radiation curable polymers according to the present invention. The preferred ethylenically unsaturated reactants for the purposes of the present invention are acrylic acid and the esters thereof, methacrylic acid and the esters thereof, ethylene, propylene, vinyl acetate, styrene and vinyl chloride. The most preferred reactants are acrylic acid and the esters thereof and methacrylic acid and the esters thereof.

In general these polymers are prepared by reacting one or more of the monomers according to the present invention with one or more of the above described ethylenically unsaturated reactants in the presence of a free radical initiator with heating for a given period of time. As with preparation of the reactive imide monomers of the present invention, the time and/or temperature of reaction may vary as well as the free radical initiator depending on the specific reactant to be polymerized, the desired molecular weight and the like.

The polymerization reaction is illustrated below in reaction scheme 2. For the purposes of this example only, polymerization of an acrylate ester with a methacrylate ester and TMI-HEDM is illustrated.

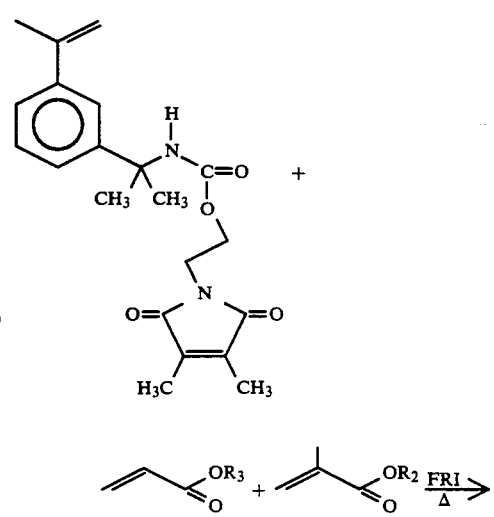

-continued

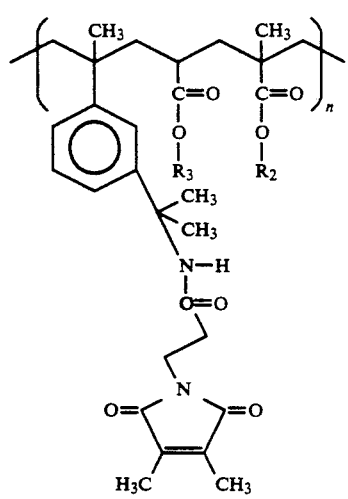

wherein $R_2$ and $R_3$ are alkyl or amide and FRI represents free radical initiator.

Reaction Scheme 2

It is emphasized that the Reaction scheme 2 is presented for illustrative purposes only where any one of the other reactant(s) discussed herein may be utilized to prepare the radiation curable polymers according to the present invention. The polymers of the present invention may also be prepared by cationic or anionic polymerization processes as long as the imide double bond remains unreacted.

Radiation Curing and Radiation Cured Polymers

The radiation curable polymers according to the present invention and described above may be cured by standard radiation curing techniques utilizing various forms of radiation, for example, actinic light and particularly ultraviolet light of about 180 to about 400 nanometers. In general, the term "radiation curing" as used herein, denotes curing with electromagnetic radiation. For the purposes of the present invention ultraviolet light is the preferred electromagnetic radiation for curing the polymers of the present invention.

While the radiation curable polymers of the present invention exhibit a high rate of cure without the use of photoinitiators or photosensitizers particularly when utilizing ultraviolet light as the electromagnetic radiation to initiate cure, such compounds may optionally be used with different forms of electromagnetic radiation or in the event an exceptionally high rate of cure may be required or to insure that a high percentage cure is achieved.

Photoinitiators are compounds which absorb photons and thereby obtain energy to form radical pairs, at least one of which is available to initiate additional polymerization. Photosensitizers are compounds which are good absorbers of photons, but which are themselves poor photoinitiators. They absorb photons to produce excited molecules which then interact with a second compound to produce free radicals suitable for initiation of addition polymerization. The second compound may be a monomer, a polymer or an added initiator. Examples of photoinitiators are benzoin, methyl benzoin ether, butyl benzoin ether, isobutyl benzoin ether, $\alpha,\alpha$-diethoxyacetophenone, $\alpha,\alpha$-dimethoxy-$\alpha$-phenylacetophenone, $\alpha$-chloroacetophenone and methyl phenylglyoxylate. Examples of photosensitizers are benzil, 1-naphthaldehyde, anthraquinone, benzophenone, 3-methoxybenzophenone, benzaldehyde and anthrone. Photopromoters are compounds which do not absorb photons but improve the efficacy of photosensitizers and photoinitiators by acting as exceptionally good hydrogen donors. Amines, as a class, are good photopromoters, with specific classes of amines such as tertiary alkyl amines, tertiary alkanol amines and diamines including particularly good photopromoters.

The amount of photosensitizer, photopromoter, or photoinitiator, or mixtures of two or three of these compounds present in the radiation curable composition can vary widely. When any of these materials are present, the amount is usually in the range of from about 0.01 to about 20 percent by weight of the polymerizable compound of the composition. Most often the amount is in the range of from about 0.1 to about 5 percent. When the coating is to be cured by exposure to ionizing radiation, these materials are usually omitted from the composition, although their presence is permissible.

While the radiation curable polymers of the present invention may be cured simply by casting from a solvent, drying the cast polymer and irradiating with ultraviolet light, these polymers may also be formulated into various compositions for such applications as photoresists and soldermasks, UV curable inks and UV curable coatings (particularly where chemical resistance is required). The formulation of such compositions and the additives or compounding agents that may optionally be included in such compositions is further described below.

Extender pigments may be present in the composition, and when ultraviolet light is used to cure the film, it is preferred that the extender pigment be substantially transparent to ultraviolet light. Examples of ultraviolet light transparent extender pigments are silica, calcium carbonate, barium sulfate, talc, aluminum silicates, sodium aluminum silicates and potassium aluminum silicates.

Hiding and/or coloring pigments may optionally be present. When the pigment is of the ultraviolet light absorbing type and the coating composition is to be cured by exposure to ultraviolet light, the pigment should be used in amounts which do not preclude curing of the interior of the coating. Examples of hiding pigments are titanium dioxide, antimony oxide, zirconium oxide, zinc sulfide and lithophone. Examples of coloring pigments are iron oxides, cadmium sulfide, carbon black, phthalocyanine blue, pathalocyanine green, indanthrone blue, ultramarine blue, chromium oxide, burnt umber, benzidine yellow, toluidine red and aluminum powder. Individual pigments or mixtures of hiding and/or coloring pigments may be used.

Mixtures of extender pigments, hiding pigments and/or coloring pigments may also be employed. Dyes in their customarily used amounts may be present in the coating composition.

The radiation curable coating compositions of the invention of the unpigmented or "clear" type are usually prepared by simply admixing the solution of polymerizable compound dissolved in reactive solvent with such other ingredients as may be present. Where pigmented compositions are desired, it may be necessary to use conventional high speed dispersing techniques such as used with Cowles, ball mill or sand mill mixing devices to disperse the pigment in the composition.

The radiation curable coating compositions are used to form cured adherent coatings on substrates. The substrate is coated with the coating composition using substantially any technique known to the art. These include spraying, curtain coating, dipping, direct roll coating, reverse roll coating, painting, brushing, printing, drawing and extrusion. The coated substrate is then exposed to radiation of sufficient intensity for a time sufficient to cross-link the coatings. The times of exposure to radiation and the intensity of the radiation to which the composition is exposed may vary greatly. Generally, the exposure to radiation should continue until hard, solvent resistant films result. In certain applications, however, it may be desirable for the curing to continue only until the gel stage has been obtained.

Substrates which may be coated with the compositions of this invention may vary widely in their properties. Organic substrates such as wood, fiberboard, particle board, composition board, paper, cardboard and various polymers such as polyesters, polyamides, cured phenolic resins, cured aminoplasts, acrylics, polyurethanes, and rubber may be used. Inorganic substrates are exemplified by glass, quartz and ceramic materials. Many metallic substrates may be coated. Exemplary metallic substrates are iron, steel, stainless steel, copper, brass, bronze, aluminum, magnesium, titanium, nickel, chromium, zinc and alloys. Expecially suitable substrates are those of paper or paperboard bearing printed or decorative indicia over which a fast-curing protective transparent or pigmented film is formed from compositions containing amide acrylate of the invention. The compositions are also suitable as fillers for porous materials like wood and for topcoats for vinyl overlays and free vinyl overlays.

Cured coatings of the radiation curable coating composition usually have thicknesses in the range of from about 0.001 millimeter to about 3 millimeters. More often they have thicknesses in the range of from about 0.002 millimeter to about 0.3 millimeter, and most preferred are coatings ranging from 0.002 millimeter to 0.10 millimeter. Thickness of cured polymer systems according to the present invention is due in part to the formation of cross-linked polymer network of the polymer chains upon curing.

It is difficult to cure a combination of two or more polymers which exhibit different properties. Specifically, the curing of two different polymers may not yield a homogeneous product. However, the cured coatings of the present invention may contain at least two different radiation curable polymers. The curing of at least two different polymers of the present invention results in the formation of an interpenetrating polymer network. The interpenetrating polymer network is characterized by cross-linking between monomers, represented by Formula (I) and e.g., a triacylate maleimide, of different radiation curable polymers. That is, different radiation curable polymers are polymers of the present invention wherein the Q groups, as previously defined, are different. The interpenetrating polymer networks exhibit properties indicative of all of the radiation curable polymers used therein.

The following examples will serve to illustrate the novel features and advantages of the present invention. While these examples will show one skilled in the art how to operate within the scope of this invention, they are not to serve as a limitation on the scope of the invention where such scope is only defined in the claims.

I. PREPARATION OF REACTIVE IMIDE MONOMERS

Example 1

Synthesis of [m-Isopropenyl-$\alpha,\alpha$-dimethylbenzyl isocyanate and N-(2-hydroxyethyl)-2,3-dimethylmaleimide] (TMI-HEDM) Photomonomer To a one pint bottle is added 85.54 g (0.425 moles) of TMI (m-Isopropenyl-$\alpha,\alpha$-dimethylbenzyl isocyanate), 71.83 g (0.425 moles) of HEDM [N-(2-hydroxyethyl)-2,3-dimethylmaleimide] and two drops of stannous octoate. The bottle is then loosely capped and placed in an oven at 100° C. As the temperature rises above 60° C. the HEDM dissolves and the reaction initiates as is evident by an increase in viscosity. The bottle is shaken regularly to insure good mixing. After four hours at 100° C., a sample is taken for IR and is found to have no residual —NCO. The product is a clear viscous liquid and is used without further purification.

Example 2

Synthesis Vinylbenzyl Dimethylmaleimide (VB-DMI) Photomonomer

To a 500 ml 3-neck flask equipped with a condenser, thermometer and mechanical stirrer is added 20 g (0.159 moles) of 2,3-dimthylmaleimide and 300 ml of dimethylformamide. The solution is heated to 70° C., and 9 g of potassium hydroxide in 25 ml of methanol is added to generate the anion. While at 70° C., 24.4 g of vinylbenzyl chloride is added, giving an immediate exotherm to 87° C. and the developing of a dark brown color. The reaction mixture is held at 70° C. for two hours. The reaction mixture is cooled, transferred to a separatory funnel and toluene is added. The DMF is washed from the product using water. The toluene layer is then dried and concentrated to give 25.7 g of product as a reddish brown oil (67% yield).

II. PREPARATION OF RADIATION CURABLE POLYMERS OF TMI-HEDM

For the purpose of this invention, percent functionality refers to the weight percent of reactive imide monomers incorporated into the radiation curable polymers.

Example 3

Synthesis of a (TMI-HEDM) Photopolymer with 5% Functionality

The polymerization is conducted in a 2-liter kettle reactor equipped with a condenser, thermometer, mechanical stirrer, nitrogen purge, and feed pumps for monomers and initiator. The reactor is charged with 650 g of ethyl acetate and heated to 80° C. under a nitrogen purge. The monomer feed tank contains 75.0 g of methacrylic acid, 435.0 g of ethyl acrylate, 202.5 g of ethyl methacrylate and 37.5 g of TMI-HEDM photomonomer. The free radical initiator used is Vazo 67 and is diluted with 100 g of ethyl acetate and charged to its own feed tank. When the reactor temperature reaches 80° C., both feed pumps are started at such a rate as to deliver the monomer feed in three hours and the initiator feed in four hours. After completion of the initiator feed the reaction is held at temperature for one hour and then the reaction is terminated and product collected. Typical properties of the polymer are listed in Table 1 below.

Example 4

Synthesis of a (TMI-HEDM) Photopolymer with 10% Functionality

The procedure described in Example 3 above can be used to prepare a photopolymer with 10% TMI-HEDM when accompanied by the following change in monomer composition:

| | |
|---|---|
| Methacrylic acid | 75.00 g |
| Ethyl acrylate | 416.25 g |
| Ethyl methacrylate | 183.75 g |
| TMI-HEDM photomonomer | 75.00 g |

EXAMPLE 5

Synthesis of a (TMI-HEDM) Photopolymer with 15% Functionality

The procedure described in Example 4 above can be used to prepare a photopolymer with 15% TMI-HEDM when accompanied by the following change in monomer composition:

| | |
|---|---|
| Methacrylic acid | 67.50 g |
| Ethyl acrylate | 410.25 g |
| Ethyl methacrylate | 168.75 g |
| TMI-HEDM photomonomer | 112.50 g |

III. PREPARATION OF RADIATION CURED POLYMERS

Example 6

Synthesis of the Radiation Cured Polymer of Example 4

Thin film samples of the polymer of Example 4 are prepared by casting from ethyl acetate on release paper to give approximately 1 mil films. Films are allowed to air dry and then are dried at 80° C. for 30 minutes prior to UV curing. The films are irradiated using a RPC Industries Ultraviolet Processor using two medium pressure arc lamps at a line speed of 20 feet per minute. In each case, conversion of the thermoplastic acrylic to a thermosetting acrylic is verified by their insolubility in THF after curing.

IV. EVALUATION OF RADIATION CURED POLYMERS

Example 7

Percentage of Area Swell After Immersion in Tetrahydrofuran (THF).

Each of the photopolymers of Examples 3, 4 and 5 are tested for percentage area swell. A 1×1 inch square 1 mil thick sample die is cut from the castings on release paper. The sample is immersed in THF for four hours at ambient temperature and then measured for the amount of area swell. The results are given in Table 1 below.

TABLE 1

| Percentage of Functionality Photomonomer | | | |
|---|---|---|---|
| | Example 3 | Example 4 | Example 5 |
| Percent[2] Methacrylic Acid | 10 | 10 | 9 |
| Percent[2] Ethyl Acrylate | 58 | 55.5 | 53.2 |
| Percent[2] Ethyl Methacrylate | 27 | 24.5 | 22.5 |
| Percent[2] TMI-HEDM Photomonomer | 5 | 10 | 15 |
| Molecular Weight | 181,000 | 256,000 | 147,000 |

TABLE 1-continued

| Percentage of Functionality Photomonomer | | | |
|---|---|---|---|
| | Example 3 | Example 4 | Example 5 |
| Percentage Area Swell | 300 | 189 | 156 |
| Acid Number | 76.01 | 72.35 | 70.77 |
| T(g) °C. | 40.00 | 29.00 | 40.00 |

[2]Weight Percentage

V. PREPARATION OF RADIATION CURABLE COMPOSITIONS

Example 8

A Cowles-type mixing aperture is charged with 65.3 parts of the photopolymer of Example 4, 5.6 parts talc ("Mistron RCS"; Cyprus Industrial Minerals), 275 parts aluminum silicate, 27.5 parts silica ("Imsil A-25; Illinois Minerals) and 13.8 parts ground marble. The material is mixed until a homogeneous dispersion is obtained. Equal to or greater than thin films with a thickness of approximately 1 mil are applied to an appropriate medium (e.g., thin film paper or particle board) by either a Bond draw-down applicator or by casting from ethyl acetate and drying at 80° C. for thirty minutes.

The films are cured by irradiating having a RPC Industries Ultraviolet Processor using two medium pressure arc lamps at a line speed of 20 feet per minute.

Example 9

A Cowles-type mixing apparatus is charged with 100 parts of the photopolymer of Example 4, 52 parts TINTM triisononyltrimellitate (Exxon Chemical Company) 5 parts epoxized soy bean oil, 10 parts pigment calcined clay (Freeport Kaolin), 10 parts calcium carbonate, 8 parts Dythal XL dibasic lead phthalate NL, and 0.25 parts stearic acid. The materials are mixed until a homogeneous composition is obtained. [Same as in Example 8, after red indicator.]

While the invention has been explained in relation to its above preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A compound of the formula

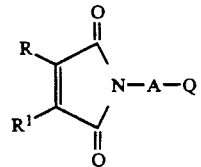

wherein R and R[1] are the same or different and are selected from the group consisting essentially of H, —CH$_3$, —CH$_2$CH$_3$ and —Cl with the proviso that only one of R and R[1] may be H, A is —(CH$_2$)—$_n$ wherein n is 1 to 4, and $\{$CH$_2)_n$—Y— wherein Y is

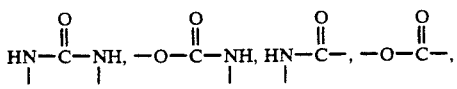

-continued
and Q is
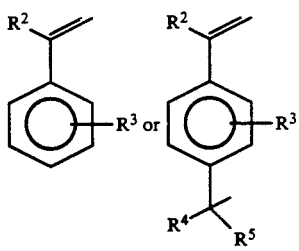
wherein R² is hydrogen or lower alkyl, R³ represents hydrogen, lower alkyl or halogen and R⁴ and R⁵ are the same or different and represent hydrogen or alkyl.
2. The compound of claim 1 wherein R and R¹ are methyl, A is CH₂ and Q is
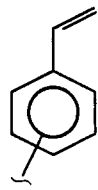
3. The compound of claim 1 wherein R and R¹ are methyl, A is
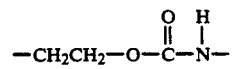
and Q is
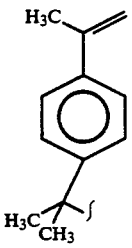
4. The compound of claim 1 wherein R and R¹ are methyl, A is
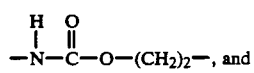
Q is
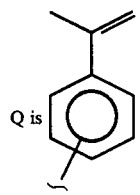
* * * * *